(12) United States Patent
Obergfell

(10) Patent No.: US 9,600,947 B2
(45) Date of Patent: Mar. 21, 2017

(54) LOCK SYSTEM, IN PARTICULAR FOR A MOTOR VEHICLE

(71) Applicant: MARQUARDT GMBH, Rietheim-Weilheim (DE)

(72) Inventor: Robert Obergfell, Tuningen (DE)

(73) Assignee: Marquardt GmbH, Rietheim-Weilheim (DE)

( * ) Notice: Subject to any disclaimer, the term of this patent is extended or adjusted under 35 U.S.C. 154(b) by 839 days.

(21) Appl. No.: 13/888,508

(22) Filed: May 7, 2013

(65) Prior Publication Data

US 2013/0293348 A1 Nov. 7, 2013

Related U.S. Application Data

(63) Continuation of application No. PCT/EP2011/005649, filed on Nov. 10, 2011.

(30) Foreign Application Priority Data

Nov. 11, 2010 (DE) .................. 10 2010 051 026

(51) Int. Cl.
  *G05B 19/00* (2006.01)
  *G07C 9/00* (2006.01)
  *B60R 25/24* (2013.01)

(52) U.S. Cl.
  CPC .......... *G07C 9/00174* (2013.01); *B60R 25/24* (2013.01)

(58) Field of Classification Search
  CPC ............ G07C 9/00309; G07C 2209/62; G07C 2209/65; G07C 9/00182; G07C 9/00857;
  (Continued)

(56) References Cited

U.S. PATENT DOCUMENTS 5,841,363 A   11/1998 Jakob et al.
6,064,298 A * 5/2000 Zimmer .................. B60R 25/04
                                                        340/426.11
(Continued)

FOREIGN PATENT DOCUMENTS

DE   43 40 260 A1   4/1995
DE   101 49 276 A1   4/2003
(Continued)

OTHER PUBLICATIONS

German Search Report dated Nov. 16, 2011.
International Search Report and Written Opinion dated Mar. 1, 2012.

*Primary Examiner* — Kerri McNally
*Assistant Examiner* — Renee Dorsey
(74) *Attorney, Agent, or Firm* — Burr & Brown, PLLC

(57) ABSTRACT

A lock system including a first device which has at least two states and is embodied as a control device, and an associated second device which is embodied in the manner of an electronic key, an ID signal generator, a chip card or the like. The two devices have transmitters and/or receivers for, in particular, electromagnetic signals. In particular, at least one of the signals transmitted between the second device and the first device is an encoded operating signal for authenticating the second device, with the result that after positive evaluation of the transmitted operating signal in the case of an authorized second device it is possible to bring about a change in the state of the first device.

14 Claims, 5 Drawing Sheets

(58) Field of Classification Search
CPC ........... G07C 2009/00198; G07C 2009/00261;
G07C 2009/00365; G07C 2009/00373;
G07C 2009/00396; G07C 2009/00412;
G07C 2009/00611; G07C 2009/00769;
B60R 25/24; B60R 25/04; B60R 25/20;
B60R 25/245; E05B 81/77; E05B 81/78
USPC ............... 340/5.6–5.67, 426.1, 427–430,
340/426.11–19, 3, 426.2–29, 426.3–36,
340/562, 563
See application file for complete search history.

(56) References Cited

U.S. PATENT DOCUMENTS

| | | | |
|---|---|---|---|
| 6,496,153 | B2 | 12/2002 | Boulesteix |
| 6,870,458 | B2* | 3/2005 | Caren ................ B60R 25/24 307/10.3 |
| 2003/0043023 | A1* | 3/2003 | Perraud ............. G06K 7/0008 340/10.1 |
| 2003/0085620 | A1 | 5/2003 | Herbrik |
| 2004/0075531 | A1* | 4/2004 | Ieda ................... B60R 25/246 340/5.72 |
| 2006/0077035 | A1* | 4/2006 | Mamaloukas ..... G07C 9/00309 340/5.61 |
| 2008/0204117 | A1 | 8/2008 | Richter |
| 2010/0127820 | A1 | 5/2010 | Froitzheim |
| 2010/0309901 | A1* | 12/2010 | Beghini .............. H04B 1/0057 370/343 |

FOREIGN PATENT DOCUMENTS

| | | |
|---|---|---|
| DE | 20 2006 001 837 U1 | 4/2006 |
| DE | 10 2007 009 100 A1 | 8/2008 |
| DE | 10 2008 015 477 A1 | 10/2008 |
| DE | 100 04 616 A1 | 8/2011 |
| EP | 0 311 128 A1 | 4/1989 |
| EP | 1 035 504 B1 | 12/2000 |
| EP | 1 762 678 A1 | 3/2007 |
| EP | 1 902 913 A1 | 3/2008 |
| WO | 2008/092741 A1 | 8/2008 |

\* cited by examiner

LOCK SYSTEM, IN PARTICULAR FOR A MOTOR VEHICLE

CROSS REFERENCE TO RELATED APPLICATIONS

This application is a continuation of International Application No. PCT/EP2011/005649 filed Nov. 10, 2011, which designated the United States, and claims the benefit under 35 USC §119(a)-(d) of German Application No. 10 2010 051 026.2 filed Nov. 11, 2010, the entireties of which are incorporated herein by reference.

FIELD OF THE INVENTION

The invention relates to a lock system, particularly for a motor vehicle.

BACKGROUND OF THE INVENTION

In the case of increased safety requirements, electronic lock systems are used which operate, for example, by means of electromagnetic waves. In particular in the case of motor vehicles, such lock systems are used as door locking systems for the access authorization and/or as ignition lock systems, steering wheel locks, immobilizers or the like for the driving authorization.

Lock systems of this kind are known from DE 43 40 260 A1. The lock system is composed of a first device which has at least two states and is embodied as a control device for unlocking and/or locking the car doors, the ignition lock or the like, and of an associated second device which is embodied in the manner of an electronic key. The two devices have, for the operation thereof in accordance with the regulations, transmitters and/or receivers for transmitting the electromagnetic signals. During operation according to the regulations, at least one signal can be transmitted as an encoded operating signal between the key and the control device for authenticating the key, with the result that after positive evaluation of the transmitted operating signal and therefore in the case of an authorized key it is possible to bring about a change in the state of the control device.

Such lock systems are also further developed with what are referred to as "Keyless" functionalities. Therefore, in the "KeylessEntry" functionality, there is no longer any need for manual activation of the electronic key by the user. It is sufficient that the user carries the key on his person. The operating signal is then transmitted automatically between the two devices for the access authorization when the user is located in a range of action located in the vicinity of the motor vehicle and activates, for example, the door handle on the car door. Likewise, these lock systems can have a "KeylessGo" functionality, wherein the operating signal for the driving authorization is transmitted automatically between the two devices when the user is located inside the motor vehicle and activates, for example, a start/stop key in the dashboard. In order to transmit the signals, at least one antenna, which can interact with an oscillatory circuit for at least one of the signals, is assigned to the first device.

With these keyless lock systems, it is necessary to take the precaution that in the event of a failure of the keyless functionality, for example, in the case of an empty battery in the electronic key, an emergency operating mode of the motor vehicle is made possible. Therefore, in this case the access to the motor vehicle can be made possible by means of a mechanical emergency key by virtue of the fact that a mechanical door lock is located on a car door. Furthermore, an emergency driving authorization means may be present by virtue of the fact that the electronic key can be plugged into an ignition lock located in the vehicle for the activation thereof. It is also known that in such an emergency the electronic key interacts with an additional transponder reading unit, located in the vehicle, for the driving authorization. However, the provision of such an emergency functionality requires a certain amount of complexity as well as additional costs.

SUMMARY OF THE INVENTION

The present invention is based on the object of simplifying the emergency functionality for keyless vehicles. In particular, the vehicle topology is to be simplified and/or a cost saving is to be achieved in vehicles with keyless equipment by eliminating the ignition lock or a similar transponder reading unit for the driving authorization in the basic operating mode.

In the lock system according to the present invention, the antenna can be switched between transmitting mode for the keyless functionality and receiving and/or transmitting mode for an emergency functionality when the keyless functionality fails. In particular the switching takes place by virtue of the fact that the oscillatory circuit is operated in the transmitting mode as a high-quality series oscillatory circuit and in the receiving mode as a low-quality parallel oscillatory circuit. The invention therefore provides a switchable keyless antenna which permits the double use for the operation with a keyless functionality and for the emergency functionality. This advantageously permits the elimination of an electronic ignition lock and/or of a transponder reading unit.

In one development, the first device transmits a first electromagnetic signal for the associated second device which is embodied, for example, as a transponder key and/or radio key as a wake-up signal. As a result, the second device is transferred from a state of rest with a reduced energy requirement into an activated state for operation in accordance with the regulations. After transmission of the first electromagnetic signal, the first device can transmit a range delimiting signal as a third electromagnetic signal, with the aid of which the associated second device can determine its location with respect to the first device on and/or in the motor vehicle. The location of the second device with respect to the first device on and/or in the motor vehicle is subsequently transmitted with a fourth signal as a response signal from the second device to the first device. If these signals are successfully transmitted the authentication of the second device is finally carried out by means of further fifth signals as encoded operating signals. If the preconditions necessary for the waking up and the range delimitation are therefore not met, the authentication, which is complicated per se, is not carried out at all, which makes possible a more efficient operating mode for the lock system. The fifth electromagnetic signal which serves for authentication can finally be transmitted in a bidirectional communication, which increases the security against theft and is comprised of a plurality of component signals, between the first and second devices.

A second electromagnetic signal can be transmitted as a selection signal between the wake-up signal and the range delimiting signal, which selection signal contains, in particular, information for identifying the motor vehicle. With the aid of the selection signal, the dialog with the second device can already be aborted early if the second device is associated with another motor vehicle which is, however, under certain circumstances of the same type of motor vehicle. As a result, second devices which are assigned only to the same type of motor vehicle are activated and/or remain in the activated state and non-associated second devices which are in the activated state are returned to the state of rest. As a result, in each case a further increase in the efficiency of the operating mode of the lock system is possible.

It is particularly preferred to use an inductive signal for the wake-up and/or range delimiting signal by virtue of the fact that the carrier wave for the first signal and/or the third signal has a frequency which is in the inductive, low-frequency (LF) range. Owing to the limited range of an inductive signal, the range of action for the lock system can therefore be set easily. At the same time, this increases the protection against tampering with the lock system by unauthorized users. For example, the frequency for the LF carrier wave can be approximately 20 kHz, 120 kHz, 125 kHz or the like. Furthermore, it is preferred to use a radio signal for the selection signal and/or the response signal and/or the encoded operating signal by virtue of the fact that the carrier wave for the second signal and/or the fourth and/or the fifth signals has a frequency which is in the relatively high-frequency (RF) range. This provides an increased range of action for the user for reasons of convenience. For example, the frequency for the RF carrier wave can be approximately 315 MHz, 433 MHz, 868 MHz or the like.

The antenna can comprise a coil as a low-frequency (LF) antenna, wherein a capacitor can be connected in series and/or in parallel with respect to the coil. The coil and the capacitor then form a series and/or parallel oscillatory circuit in order to excite the antenna to emit the corresponding electromagnetic waves.

In a simple and cost-effective embodiment of the present invention, in the first device there is a half bridge which interacts with the antenna for generating the carrier frequency for at least one of the signals. In the first device there can be a power semiconductor, for example, a modulation FET, which interacts with the antenna in order to modulate data for at least one of the signals.

In the first device there is expediently a control circuit for the half bridge and/or the power semiconductor. The control circuit can easily operate the half bridge by alternately switching between electrical voltage, that is to say between positive, and ground in order to generate the carrier frequency. In an additional functionality, the control circuit can operate the power semiconductor by switching between the high-impedance and the conductive state thereof, that is to say between positive and ground, in accordance with the data to be modulated onto the carrier frequency.

In a compact embodiment, the capacitor is preferably located in the first device. The capacitor can be connected to ground in parallel with respect to the coil by continuously switching the half bridge and the power semiconductor in order therefore to form the required parallel oscillatory circuit for the emergency functionality when the keyless functionality fails. On the other hand, by correspondingly operating the half bridge to generate the carrier frequency and the power semiconductor for the data modulation the capacitor can be connected in series with respect to the coil in order to form the series oscillatory circuit provided for the keyless functionality, i.e. for undisturbed operation of the lock system.

Furthermore, in the first device there can easily be a switch which can be switched and has the purpose of switching on the receiving mode of the antenna in order therefore to activate the reception path for the emergency functionality when the keyless functionality fails. The quality reduction means for the parallel oscillatory circuit can additionally be activated by means of the switch, allowing a compact arrangement to be brought about. The switch is expediently actuated by the control circuit in the first device for the purpose of corresponding switching.

For a particularly preferred embodiment the following is to be noted. A KeylessGo antenna is used for the two following systems:

emergency driving function (in the case of nonfunctioning of the KeylessGo); and normal KeylessGo function.

In this context, automatic switching of the electric antenna properties occurs depending on the required function. In the transmitting mode a high-quality series oscillatory circuit is usually used. For the case of reception, the circuit is switched into a low-quality parallel oscillatory circuit. The capacitor which has been hitherto located directly in the transmitting antenna is now positioned in the control unit in order:

to permit switching of the series oscillatory circuit to the parallel oscillatory circuit, and to obtain a low-pass characteristic in order to achieve better immunity to irradiated interference.

The advantages achieved with the invention are, in particular, simplification of the vehicle topology and a cost saving in vehicles with KeylessGo equipment by virtue of the elimination of the ignition lock or of a similar transponder reading unit for the driving authorization in the basic operating mode by double use of a switchable KeylessGo antenna. The reduction in the costs is provided by virtue of the fact that a previously required control unit with cabling is eliminated. In addition to the simplification of the vehicle topology, the installation space which was previously required for this control unit in the vehicle is also eliminated.

BRIEF DESCRIPTION OF THE INVENTION

An exemplary embodiment of the invention with various developments and embodiments is illustrated in the drawings and will be described in more detail below.

DETAILED DESCRIPTION OF THE INVENTION

Figure 1:
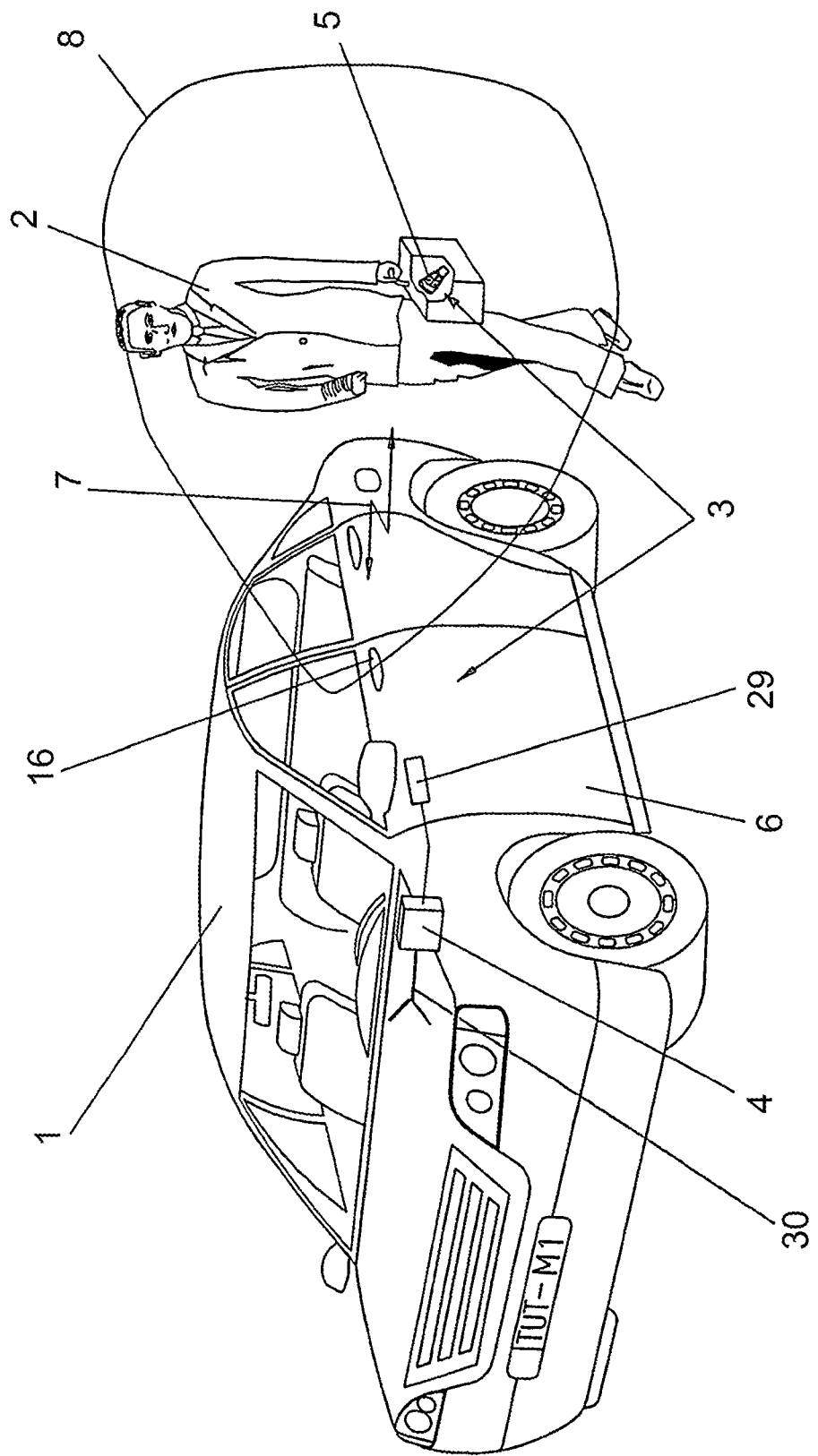
FIG. 1 shows a motor vehicle equipped with a lock system.

FIG. 1 shows a motor vehicle 1 with the authorized user 2. The motor vehicle 1 is provided, for the access authorization, with a lock system 3 as a door locking system which comprises a first device 4 which is embodied as a control device, and an associated second device 5. The second device 5 is embodied in the manner of an electronic key, an identification (ID) signal generator, a chip card, a smart card or the like. The second device 5 is in the possession of the authorized user 2, as a result of which the latter has access to the motor vehicle 1 within a range of action 8.

The first device 4 has at least two states, wherein in the first state the car doors 6 are locked and in the second state they are unlocked. The two devices 4, 5 have, for their operation in accordance with the regulations, means for transmitting and/or receiving signals 7 by means of an electromagnetic carrier wave. At least one of these signals 7 transmitted between the second device 5 and the first device 4 is an encoded, electromagnetic operating signal 15 (see FIG. 3). The encoded operating signal 15 serves to authenticate the second device 5, as a result of which, in the case of an authorized second device 5 after positive evaluation of the transmitted operating signal 15, a change can be brought about in the state of the first device 4. The encoded operating signal 15 is transmitted when the authorized user 2 activates the door handle 16 on the car door 6 or approaches the door handle 16. As a result, the unlocking of the car door 6 is triggered in accordance with the KeylessEntry functionality. Likewise, the encoded operating signal 15 can also be transmitted automatically without involvement of the user 2 as soon as the latter enters the range of action 8, which is, however, not considered in more detail in the text which follows. If the user closes the car doors 6 from the outside, the car doors 6 are automatically locked. Likewise, the automatic locking of the car doors 6 can take place after the user 2 has left the range of action 8.

The lock system 3 also determines the driving authorization for the motor vehicle 1. For this purpose, the first device 4 which is embodied as a control device also brings about, depending on the two states, the unlocking and/or locking of the ignition lock 9 (electronic ignition lock EIL) and/or of the steering wheel lock 10 (electric steering wheel lock ESWL) which can be seen in FIG. 2. Likewise such a functionally relevant component of the motor vehicle 1 can be accordingly actuated by the first device 4. For example, in this way an immobilizer, the engine control unit or the like can be enabled and/or disabled. The transmission of the encoded operating signal 15 for authenticating the second device 5 takes place when the authorized user 2 is in the motor vehicle 1 and activates a start/stop switch 11. The starting operation or the like of the motor vehicle 1 is thereby triggered in accordance with the KeylessGo functionality.

Figure 2:
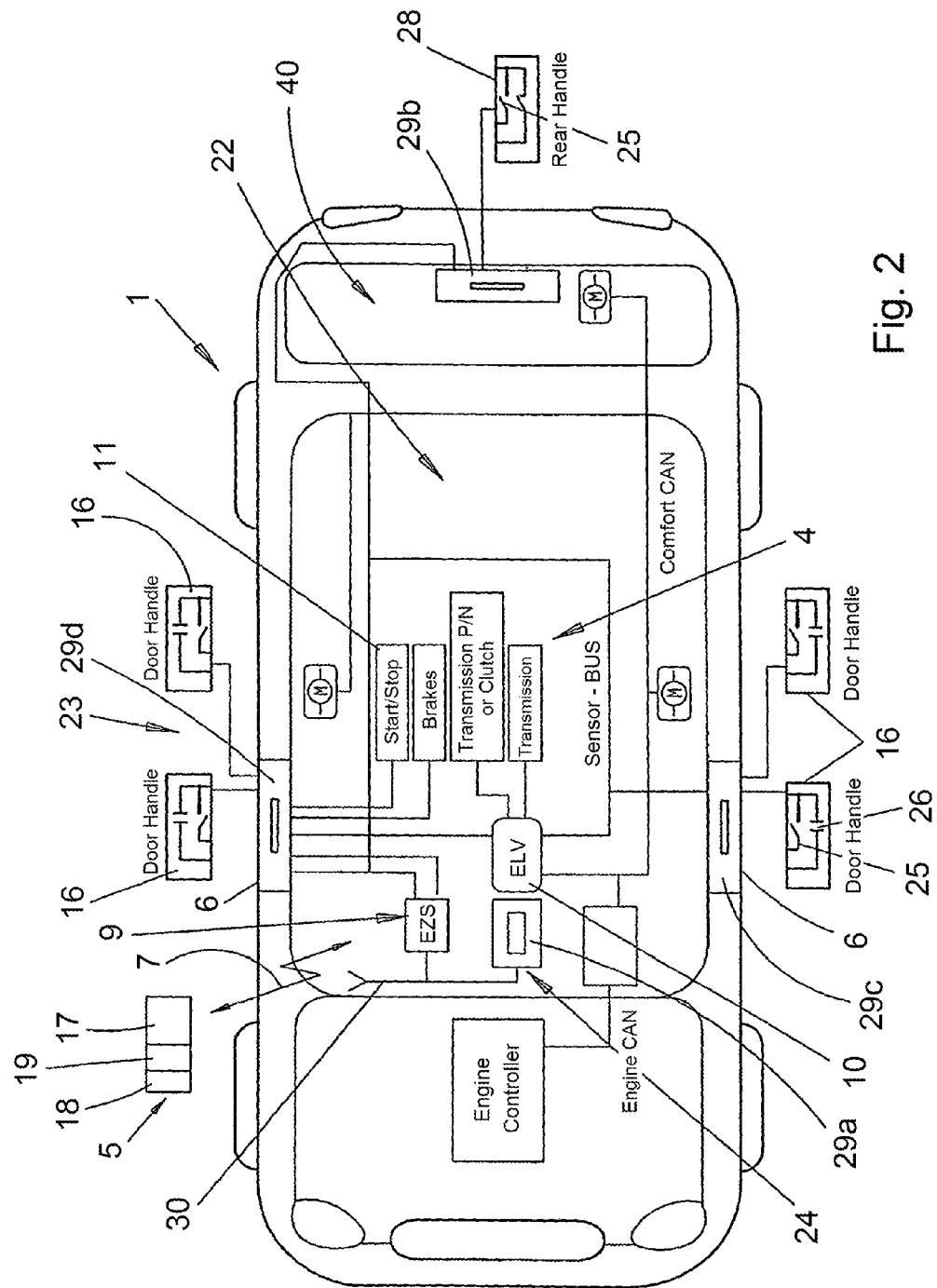
FIG. 2 shows a schematic block circuit diagram for the lock system in the motor vehicle which has a first device and a second device.

The transmission of the signals 7 for the KeylessEntry/Go functionality is triggered by activation of a switch and/or a sensor by the user 2. For the access authorization this may involve, for example, the manual activation of the door handle 16, of the rear handle 28 or the like, as can be seen in FIG. 2. For this purpose, a switch 25 is arranged in the door handle 16, rear handle 28 or the like of the motor vehicle 1. If a proximity sensor 26 is used which operates, for example, capacitively, as is also shown in FIG. 2 on the door handle 16, the sensor 26 can detect the approaching of the user's hands 2 to the door handle 16 or rear handle 28. For the driving authorization, the start/stop switch 11 which can be activated manually by the user 2 is located in the motor vehicle 1. The start/stop switch 11 is expediently arranged on the gear shift lever, on the ignition lock 9, in the dashboard, in the center console or the like in the motor vehicle 1.

The method of functioning of the lock system 3 according to the invention will now be explained in more detail with reference to FIG. 3. The first device 4 firstly transmits, by means of a transmitter/receiver 24 as means for transmitting and/or receiving signals, a first electromagnetic signal 12, designated as wake-up signal, for the associated second device 5. In this context, at least one antenna 29, 30 for transmitting the signals 7 is assigned to the first device 4.

The wake-up signal 12 transfers the second device 5 from a state of rest with a reduced energy requirement into an activated state for the operation according to the regulations. After this, the first device 4 transmits at least one further, third electromagnetic signal 13 which is also designated as range delimiting signal hereinbelow. As a result, the associated second device 5 can determine its location with respect to the first device 4. In particular, it is possible to determine whether the second device 5 is located outside on the motor vehicle 1 and, if appropriate, at what location in the exterior 23 and/or in the interior 22 of the motor vehicle 1 it is located. The second device 5 subsequently transmits, by means of a transmitter/receiver 17, a fourth signal 14, containing the information relating to the determined location, to the first device 4, which fourth signal 14 is also designated as response signal hereinbelow. Finally, as already described, the fifth electromagnetic signal is then transmitted as an encoded electromagnetic operating signal 15 between the first and the second devices 4, 5 by means of the transmitter/receiver 24, 17 for the purpose of authentication. The signal 15 can be composed, in particular, of a plurality of component signals and can be transmitted in a bidirectional communication between the two devices 4, 5. For more details on the bidirectional communication, reference is also made to DE 43 40 260 A1.

Figure 3:
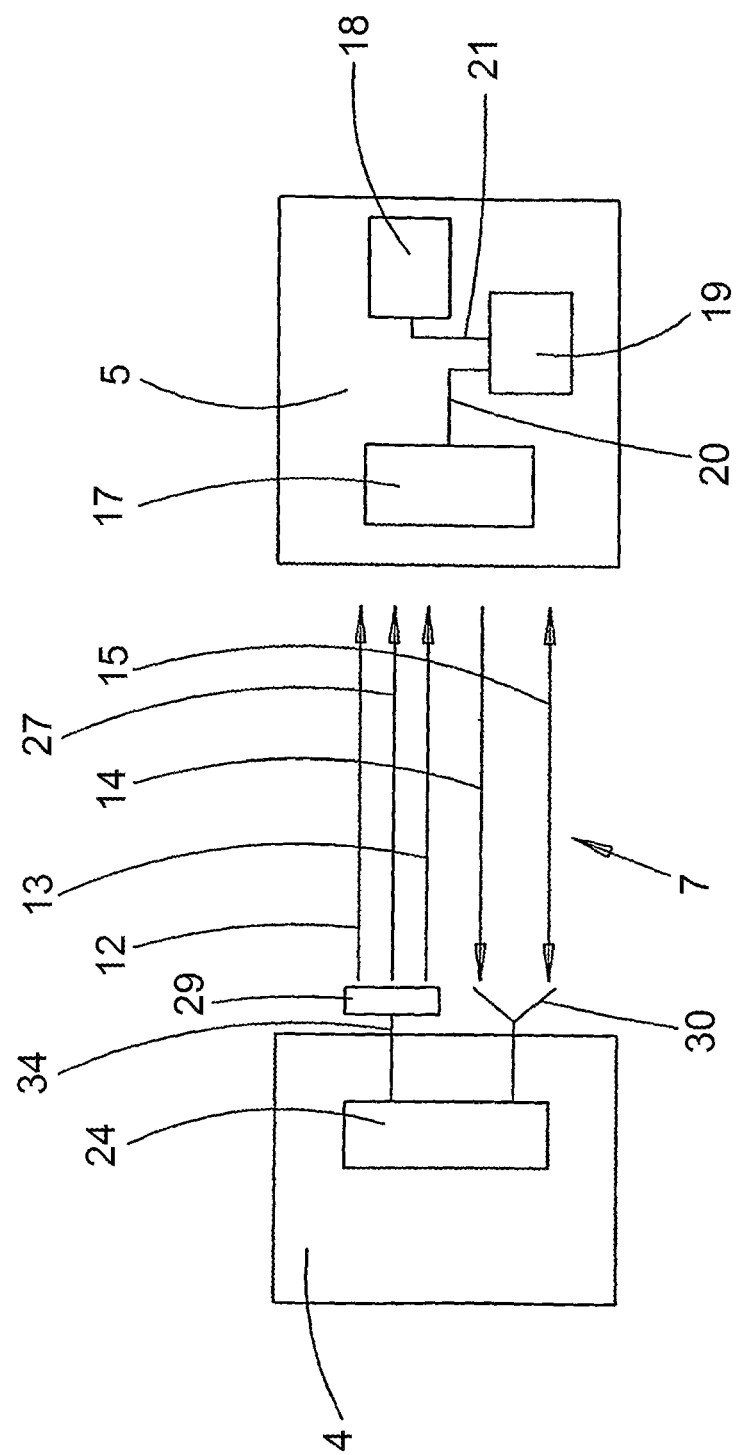
FIG. 3 shows a schematic block circuit diagram of the first device and of the second device with a diagram relating to the transmission of the signals.

The second device 5, which is shown as a schematic block circuit diagram in FIG. 3, has the transmitter/receiver 17 as a means for transmitting and/or receiving signals, and a logic circuit 18 which is composed, for example, of a microcomputer. A means 19 for measuring the field strength of at least one signal transmitted by the first device 4 is also arranged in the second device 5. The means 19 for measuring the field strength measures the field strength or the intensity of one of the transmitted signals, specifically of the range delimiting signal 13. The means 19 is expediently configured to measure the field strength as an integrated module, which is also referred to below as an RSS (Radio Signal Strength) chip. The RSS chip 19 has an input 20 which is connected to the transmitter/receiver 17, and an RSSI (Radio Signal Strength Indicator) output 21 which is in turn connected to the logic circuit 18.

The RSS chip 19 receives via the input 20 the signal 13 which is respectively received by the transmitter/receiver 17, and the RSS chip 19 generates at its RSSI output 21 an RSSI signal which is functionally dependent on the field strength of the signal 13. The RSSI signal can be, for example, proportionally or logarithmically dependent on the field strength of the signal 13. The location can then be determined in the logic circuit 18 by corresponding evaluation of the RSSI signal.

The wake-up signal 12 may contain, for example, an identifier of the motor vehicle type. After the reception of the wake-up signal 12, all the second devices 5 which are located in the range of action 8 and which are associated with the same type of motor vehicle are firstly activated. In a further embodiment of the lock system 3, the first device 4 transmits, between the first signal 12 and the third signal 13, a second electromagnetic signal 27 to the second device 5 as a selection signal, as is apparent in more detail below with respect to FIG. 3. The second signal 27 contains information about the more detailed identity of the motor vehicle 1. As a result, only the second devices 5 which are actually associated with the first device 4 remain in the activated state. However, second devices which are in the activated state and are not associated with the motor vehicle 1 are returned to the state of rest.

It is appropriate to divide the second devices 5, associated with the first device 4, into group-like lines. A motor vehicle 1 preferably has two lines, specifically a first electronic key and a spare key as a first line, and a second electronic key and a spare key as a second line. The lines expediently have a ranking order with respect to the carrying out of the authentication, with the result that if both lines are present in the range of action 8 only authentication with the line with the higher ranking is to be carried out and said line is correspondingly selected. The selection signal 27 can then additionally contain information about the lines which are assigned to the first device 4, in order to permit the lock system 3 to carry out a selection for the authentication, where appropriate.

It is particularly preferred that the carrier wave for the first signal 12 has as a wake-up signal, and/or the third signal 13 has as a range delimiting signal, a frequency which is in the inductive, low-frequency (LF) range. This frequency may be approximately 20 kHz, 120 kHz, 125 kHz or the like by way of example. Such an inductive signal advantageously has a range which is limited to the direct surroundings of the motor vehicle 1 or to the motor vehicle 1 itself. This ensures that the second device 5 is activated only when it is located in the interior 22 of the motor vehicle 1 or in one of the ranges 8 of action in the exterior 23 on the motor vehicle 1, as a result of which interference and/or safety gaps as a result of excessive ranges are avoided. Owing to the limited range of inductive signals, in each case a dedicated inductive antenna 29 is assigned to the respective ranges of the motor vehicle 1, specifically the LF antenna 29a is assigned to the interior 22, the LF antenna 29b is assigned to the rear region 40, and the LF antennas 29c, 29d are assigned to the car doors 16, as is apparent from FIG. 2. If desired, the second signal 27 can, as is shown in FIG. 3, also have a frequency which is in the low-frequency (LF) range. However, it is particularly preferred that the carrier wave for the second signal 27 has a frequency in the relatively high-frequency (RF) range as a selection signal and/or the fourth signal 14 has such a frequency as a response signal and/or the fifth signal 15 has such a frequency as an operating signal. For example, this frequency can be approximately 315 MHz, 433 MHz, 868 MHz or the like. Owing to the relatively large range of relatively high-frequency signals it is sufficient to provide merely one RF antenna 13 in the motor vehicle 1, as is clear from FIG. 2.

Figure 4:
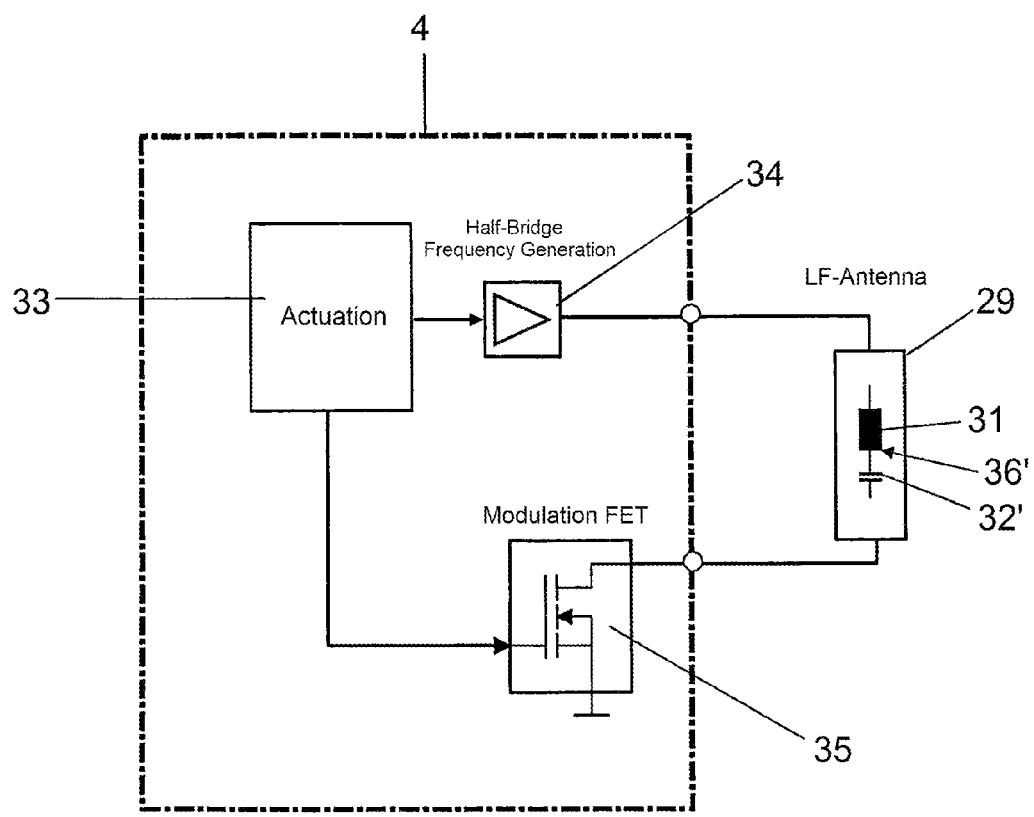
FIG. 4 shows a block circuit diagram for the first device with an assigned antenna according to the prior art.

The relatively detailed embodiment of the low-frequency LF antenna 29 in the case of a lock system 3 according to the prior art is shown in FIG. 4. The LF antenna 29 for transmitting the low-frequency signals 7 is assigned to the first device 4 and has an oscillatory circuit 36' which comprises a coil 31 and a capacitor 32' which is electrically connected to the coil 31. As a result, both the coil 31 and the capacitor 32' are arranged in the LF antenna 29, wherein a corresponding actuation circuit 33 correspondingly operates the oscillatory circuit 36' of the LF antenna 29 by means of a half bridge 34 for generating frequency and a power semiconductor 35 for modulating data, such as a modulation FET 35, in the first device 4. For the KeylessGo function in the motor vehicle 1, the first device 4 then involves the electronic ignition lock 9 and/or a KeylessGo control unit for the motor vehicle 1 in most cases. If the KeylessGo functionality has failed, for example, owing to an empty battery in the second device 5, no further precautionary measure is taken in the LF antenna 29. Instead, for this case a separate emergency activation is to be provided for the driving authorization in the motor vehicle 1.

Figure 5:
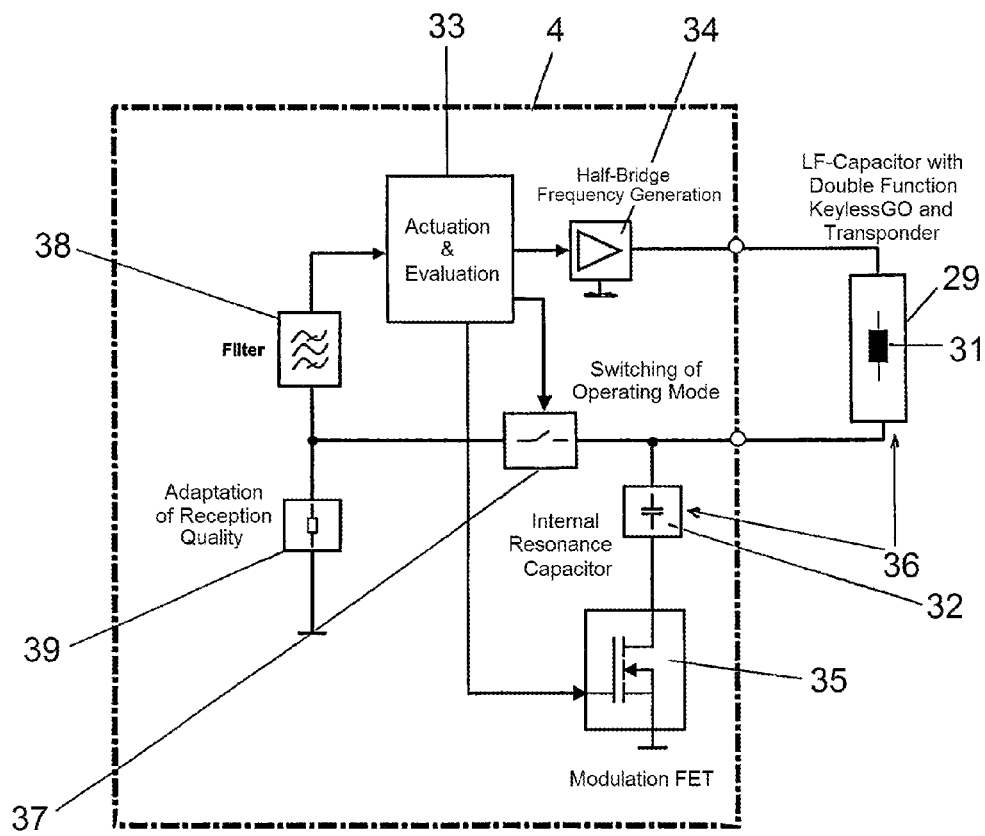
FIG. 5 shows a block circuit diagram for the first device with an assigned antenna according to the invention.

On the other hand, according to the present invention it is possible, as shown in FIG. 5, to switch the antenna 29 between transmitting mode for the keyless functionality and receiving and/or transmitting mode for an emergency functionality in the case of failure of the keyless functionality. For this purpose, the oscillatory circuit 36 is operated in the transmitting mode as a high-quality series oscillatory circuit, and in the receiving mode as a low-quality parallel oscillatory circuit. In the case of the emergency functionality, the first device 4 communicates with the second device 5 in the manner of a transponder, in which case the encoded operating signals 15 (see FIG. 3) can then also be transmitted as low-frequency signals for the purpose of authentication. In this case, the second device 5 obtains from the signals 7 transmitted by the first device 4 the energy which is required for operating the second device 5, as a result of which an emergency operating mode is made possible for the second device 5 when the battery is in fact empty. For the emergency operating mode, the user 2 then merely moves the second device 5 into the vicinity of the antenna 29.

According to FIG. 5, the low-frequency LF antenna 29 comprises a coil 31 with which a capacitor 32 which is connected in series and/or in parallel with the coil 31 interacts in such a way that a series and/or parallel oscillatory circuit 36 is formed. The capacitor 32 is preferably located in the first device 4. Furthermore, the capacitor 32 can be switched in series and in parallel with respect to the coil 31 in order to form the series and/or parallel oscillatory circuit 36. The switching into the parallel oscillatory circuit 36 takes place by switching the half bridge 34 and the modulation FET 35 continuously to ground. In contrast, the switching into the series oscillatory circuit 36 is provided in the keyless operating mode by virtue of the fact that for this purpose the half bridge 34 is operated by alternately switching between positive and ground in order to generate the carrier frequency, and the modulation FET 35 by switching between the high-impedance state and ground in accordance with the data to be applied by modulation, wherein the half bridge 34 and the modulation FET 35 are correspondingly actuated by the control circuit 33. The reception path in the first device 4 and a component 39 for reducing quality can be actuated by means of a switchable switch 37. The switch 37 is in turn actuated for the purpose of switching by the control circuit 33 in the first device 4, in order to correspondingly switch between the keyless functionality in the usual operating mode and for the keyless functionality in the event of failure of the keyless functionality. In the transponder mode for the emergency functionality, corresponding evaluation is carried out for the purpose of authentication in the control circuit 33. In addition to the half bridge 34 and the modulation FET 35, a filter 38 and the component 39 for adapting the quality for reception in the transponder mode can also be provided in the first device 4. The quality of the oscillatory circuit 36 is a measure of the attenuation thereof, that is to say for how long the oscillatory circuit 36 can maintain a free oscillation. In order to facilitate, for the purpose of the reception during the transmission of data in the transponder mode, damping of the oscillation, transmitted by the first device 4, by the second device 5, the quality of the oscillatory circuit 36 is then correspondingly lowered with the aid of the component 39.

The present invention is not restricted to the exemplary embodiment described and illustrated. The invention also comprises all the expert developments within the scope of the patent claims. Such a lock system can therefore be used not only in a motor vehicle. Use for a door lock which is located, for example, on a piece of furniture or the like, or for other control units, is also possible.

LIST OF REFERENCE NUMBERS

1: Motor vehicle/vehicle
2: (Authorized) user
3: Lock system
4: First device
5: Second device
6: Car door
7: Signal
8: Range of action
9: Ignition lock
10: Steering wheel lock
11: Start/stop switch
12: (First) signal/wake-up signal
13: (Third) signal/range delimiting signal
14: (Fourth) signal/response signal
15: (Fifth) signal/(encoded) operating signal
16: Door handle
17: Transmitter/receiver (in the second device)
18: Logic circuit/microprocessor
19: Means for measuring the field strength/RSS chip
20: Input (from RSS chip)
21: RSSI output (to RSS chip)
22: Interior (of motor vehicle)
23: Exterior (of motor vehicle)
24: Transmitter/receiver (in the first device)
25: Switch (in the door handle/rear handle)
26: (Proximity) sensor (in the door handle)
27: (Second) signal/selection signal
28: Rear handle
29a,b,c,d: Antenna/LF antenna
30: Antenna/RF antenna
31: Coil
32/32': Capacitor
33: Actuation circuit/control circuit
34: Half bridge
35: Power semiconductor/modulation FET
36, 36': Oscillatory circuit
37: Switch
38: Filter
39: Component (for adapting the quality)
40: Rear region (of motor vehicle)

The invention claimed is:

1. A lock system for access authorization and/or driving authorization in a motor vehicle in the manner of a Keyless Entry/Go functionality, having a first device which has at least two states and is embodied as a controller for unlocking and/or locking at least one of car doors, an ignition lock, and a steering wheel lock, and/or for enabling and/or disabling at least one of an immobilizer and an engine control unit, and having an associated second device which is embodied in the manner of at least one of an electronic key, an ID signal transmitter and a chip card, wherein the two devices have, for their intended operation, transmitters and/or receivers for electromagnetic signals, wherein at least one of the signals transmitted between the second device and the first device is an encoded operating signal for authenticating the second device, with the result that after positive evaluation of the transmitted operating signal in the case of an authorized second device it is possible to bring about a change in the state of the first device, and wherein at least one antenna interacts with an oscillatory circuit and transmits at least one of the signals, wherein the antenna is assigned to the first device and wherein the antenna can be switched by switching the oscillatory circuit in the first device between a transmitting mode for the keyless functionality, whereby the oscillatory circuit is operated as serial oscillatory circuit, and a receiving and/or transmitting mode for an emergency functionality when the keyless functionality fails, whereby the oscillatory circuit is operated as parallel oscillatory circuit.

2. The lock system as claimed in claim 1, wherein the first device transmits a first signal for the associated second device as a wake-up signal, in such a way that the second device is transferred from a state of rest with a reduced energy requirement into an activated state for the intended operation, wherein after transmission of the first signal the first device transmits at least one third signal as a range delimiting signal such that the associated second device can determine its location with respect to the first device, on and/or in the motor vehicle, wherein the second device subsequently transmits a fourth signal, containing the location, to the first device, wherein the encoded operating signal is transmitted as a fifth signal between the second device and the first device in order to authenticate the second device, and wherein the fifth electromagnetic signal which serves for authentication is transmitted in a bidirectional communication, comprised of a plurality of component signals, between the first and second devices.

3. The lock system as claimed in claim 2, wherein a carrier wave for the first signal and/or the third signal has a frequency which is in the inductive, low-frequency range and wherein a carrier wave for a second signal and/or the fourth signal and/or the fifth signal has a frequency which is in the relatively high-frequency range and is approximately 315, 433, or 868 MHz.

4. The lock system as claimed in claim 1, wherein the antenna comprises a coil as a low-frequency LF antenna, wherein a capacitor can be connected in series and/or in parallel with respect to the coil such that a series and/or a parallel oscillatory circuit is formed.

5. The lock system as claimed in claim 1, wherein the first device includes a half bridge which interacts with the antenna for generating a carrier frequency for at least one of the signals, and wherein in the first device there is a power semiconductor which interacts with the antenna in order to modulate data for at least one of the signals.

6. The lock system as claimed in claim 1, wherein the first device includes a control circuit for a half bridge and/or a power semiconductor, wherein the control circuit operates the half bridge by alternately switching between electrical voltage and ground in order to generate a carrier frequency, and wherein the control circuit operates the power semiconductor by switching between a high-impedance and conductive state thereof in accordance with the data to be modulated.

7. The lock system as claimed in claim 1, wherein a capacitor is located in the first device, the capacitor being configured to be at least one of connected in parallel with respect to a coil by switching a half bridge and a power semiconductor to ground, and connected in series with respect to the coil by operating the half bridge and the power semiconductor.

8. The lock system as claimed in claim 1, wherein the first device includes a switch which can be switched and has the purpose of switching on the receiving mode of the antenna, wherein a quality reduction component for the parallel oscillatory circuit can be activated by means of the switch, and wherein further preferably the switch is actuated by a control circuit in the first device for the purpose of switching.

9. The lock system as claimed in claim 1, wherein the oscillatory circuit is operated in the transmitting mode as serial oscillatory circuit having a high quality and in the receiving mode as parallel oscillatory circuit having a low quality.

10. The lock system as claimed in claim 2, wherein the first device transmits, between the first and the third signals, a second signal to the second device as a selection signal, wherein the second signal contains information about the identity of the motor vehicle such that second devices associated with the first device remain in the activated state, and non-associated second devices which are in the activated state are returned to the state of rest.

11. The lock system as claimed in claim 3, wherein the carrier wave for the first signal and/or the third signal has a frequency of approximately 20, 120, or 125 kHz.

12. The lock system as claimed in claim 11, wherein the carrier wave for the second signal and/or the fourth signal and/or the fifth signal has a frequency of approximately 315, 433, or 868 MHz.

13. The lock system as claimed in claim 8, wherein a quality reduction means for the parallel oscillatory circuit can be activated by means of the switch.

14. The lock system as claimed in claim 8, wherein the switch is actuated by a control circuit in the first device for the purpose of switching.

* * * * *